US011029969B2

(12) United States Patent
Apte et al.

(10) Patent No.: US 11,029,969 B2
(45) Date of Patent: Jun. 8, 2021

(54) DETERMINING CHARACTERISTICS OF CONFIGURATION FILES

(71) Applicant: International Business Machines Corporation, Armonk, NY (US)

(72) Inventors: Ajay A. Apte, Austin, TX (US); Chang Sheng Li, Beijing (CN); Fan Jing Meng, Beijing (CN); Joseph P. Wigglesworth, Thornhill (CA); Jing Min Xu, Beijing (CN); Bo Yang, Beijing (CN); Xue Jun Zhuo, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/030,949

(22) Filed: Jul. 10, 2018

(65) Prior Publication Data

US 2018/0314535 A1    Nov. 1, 2018

Related U.S. Application Data (63) Continuation of application No. 14/735,478, filed on Jun. 10, 2015, now Pat. No. 10,048,971.

(30) Foreign Application Priority Data

Jun. 30, 2014  (CN) .......................... 201410305722.8

(51) Int. Cl.
*G06F 9/445* (2018.01)
(52) U.S. Cl.
CPC ................................ *G06F 9/44505* (2013.01)
(58) Field of Classification Search
CPC .................................................. G06F 9/44505
See application file for complete search history.

(56) References Cited

U.S. PATENT DOCUMENTS 5,999,940 A    12/1999  Ranger
7,139,764 B2   11/2006  Lee
(Continued)

FOREIGN PATENT DOCUMENTS

CN    1790257 A    6/2006
CN    1916894 A    6/2006
(Continued)

OTHER PUBLICATIONS

Office Action dated Mar. 19, 2018, Application No. 201410305722.8, filed Jun. 30, 2014.
(Continued)

*Primary Examiner* — Jensen Hu
(74) *Attorney, Agent, or Firm* — Dmitry Paskalov (57) ABSTRACT

Determining a characteristic of a configuration file that is used to discover configuration files in a target machine, a computer identifies, using information associated with a configuration item of a machine, a candidate configuration file related to the configuration item of the machine, from among a plurality of files from the machine. The computer extracts a value of a feature of the candidate configuration file and aggregates the candidate configuration file with a second candidate configuration file related to the same configuration item identified from among a plurality of files from a second machine, based on the extracted value. The computer then determines a configuration file related to the configuration item from among the aggregated candidate configuration files based on a result of the aggregation, and determines a characteristic of the configuration file related to the configuration item.

16 Claims, 5 Drawing Sheets

(56) References Cited

U.S. PATENT DOCUMENTS

| | | | |
|---|---|---|---|
| 8,640,251 B1 | 1/2014 | Lee et al. | |
| 8,660,370 B1 | 2/2014 | Yoon et al. | |
| 8,826,439 B1* | 9/2014 | Hu | G06F 21/563 |
| | | | 726/24 |
| 2003/0220860 A1 | 11/2003 | Heytens et al. | |
| 2005/0044487 A1 | 2/2005 | Bellegarda et al. | |
| 2006/0179116 A1* | 8/2006 | Speeter | G06F 8/71 |
| | | | 709/217 |
| 2007/0179959 A1 | 8/2007 | Sharma et al. | |
| 2008/0154942 A1 | 6/2008 | Tsai et al. | |
| 2009/0125461 A1* | 5/2009 | Qi | G06N 20/00 |
| | | | 706/12 |
| 2009/0210406 A1* | 8/2009 | Freire | G06F 16/35 |
| 2010/0106821 A1* | 4/2010 | Akiyama | G06F 16/288 |
| | | | 709/224 |
| 2010/0169243 A1* | 7/2010 | Su | G06N 20/00 |
| | | | 706/12 |
| 2010/0223306 A1 | 9/2010 | Liu et al. | |
| 2011/0202549 A1* | 8/2011 | Nagahori | G06F 3/0629 |
| | | | 707/769 |
| 2011/0218960 A1 | 9/2011 | Hatami-Hanza | |
| 2011/0276684 A1 | 11/2011 | Singh et al. | |
| 2012/0041952 A1* | 2/2012 | Sohma | G06F 16/345 |
| | | | 707/737 |
| 2012/0072859 A1* | 3/2012 | Wang | G06K 9/00442 |
| | | | 715/764 |
| 2013/0019231 A1 | 1/2013 | Mangard et al. | |
| 2013/0159506 A1* | 6/2013 | Stern | G06Q 50/01 |
| | | | 709/224 |
| 2013/0198716 A1 | 8/2013 | Huang et al. | |
| 2013/0290238 A1 | 10/2013 | Griffith et al. | |
| 2015/0379034 A1 | 12/2015 | Apte et al. | |

FOREIGN PATENT DOCUMENTS

| | | |
|---|---|---|
| CN | 101051322 A | 10/2007 |
| CN | 101819525 A | 9/2010 |
| CN | 101901267 A | 12/2010 |
| CN | 105446705 A | 3/2016 |

OTHER PUBLICATIONS

Curtis et al., "Evolving Shills in IT Operations Management Impact Market Share," https://www.gartner.com/doc/2089315/evolving-shifts-it-operations-management, Accessed on May 14, 2015, Jul. 23, 2012, pp. 1-1.

Brooks et al., "Cool Vendors in IT Operations Management, 2013," https://www.gartner.com/doc/2438915/cool-vendors-it-operations-management, Accessed on May 14, 2015, Apr. 18, 2013, pp. 1-1.

Search Report, dated Mar. 9, 2018, Application No. 201410305722.8, filed Jun. 30, 2014.

IBM: List of IBM Patents or Patent Applications Treated as Related (Appendix P), Jul. 10, 2018, 2 pages.

* cited by examiner

DETERMINING CHARACTERISTICS OF CONFIGURATION FILES

BACKGROUND

Embodiments of the present invention generally relate to computer file management, and more specifically, to managing configuration files.

At present, various systems including software systems and hardware systems generally use a configuration file to record information or parameters about their configurations. With the Linux system as an example, when the system is installed on a machine, it needs to configure a host name. Correspondingly, the host name is an item of configuration information of the Linux system, or a "configuration item." Typically, configuration information is tangibly stored in the form of files in the machine. The parameters, settings or any other configuration information included in the configuration file can be modified or updated, dependent on various factors such as host machine, deployment environment, usage scenario, etc.

Configuration management (CM) refers to management of a configuration file and the configuration information stored therein. Dedicated CM tools have been developed to manage such configuration files of various systems. For a CM tool, it is a fundamental and important function to automatically discover a configuration file among a plurality of files stored in the machine.

Typical CM tools rely on pre-defined scripts, rules, or a user's expertise to determine which file(s) stored in the machine is a configuration file. However, with the increasing complexity of systems and the versatility of configuration files, traditional CM tools typically cannot discover all of the configuration files, which can cause a degradation in the accuracy of CM management. Moreover, for those configurations that fail to be discovered automatically, the user typically has to discover them manually or semi-manually. For example, a human user has to look up those configuration files that cannot be discovered automatically, one by one, according to rules prescribed by experts or documents. This process is likely time-consuming, inefficient, and inaccurate. Additionally, rule or script-based configuration file discovery is specific to a system or application. In other words, different CM management tools must be developed for each different system, which deteriorates the universality of CM management and increases the development cycle and costs of a CM management tool.

In order to automatically discover a configuration file in a machine, the key issue lies in accurately determining a characteristic of the configuration file, and representing such a characteristic in an appropriate manner. It should be appreciated that the characteristic of the configuration file is the basis for automatic discovery of the configuration file.

SUMMARY

Embodiments of the present invention disclose a method, computer program product, and system for determining a characteristic of a configuration file that is used to discover configuration files in a target machine. A computer identifies, using information associated with a configuration item of a machine, a candidate configuration file related to the configuration item of the machine, from among a plurality of files from the machine. The computer extracts a value of a feature of the candidate configuration file and aggregates the candidate configuration file with a second candidate configuration file related to the same configuration item identified from among a plurality of files from a second machine, based on the extracted value. The computer then determines a configuration file related to the configuration item from among the aggregated candidate configuration files based on a result of the aggregation, and determines a characteristic of the configuration file related to the configuration item.

It should be understood through the following description that according to embodiments of the present invention, for any given feature item, candidate configuration files associated therewith may be identified in multiple machines. Then, the candidate configuration files may be aggregated based on one or more feature values of these candidate configuration files, and through the aggregating, it may be determined which are true candidate configuration files. Based on a result of such aggregating, common characteristics of those configuration files related to the given configuration item can be determined or learned. For any given target machine, such characteristic may be utilized to accurately identify the configuration files therein so as to realize automatic discovery of the configuration files. Other features and advantages of the present invention will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent. In the drawings.

In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein.

Figure 1:
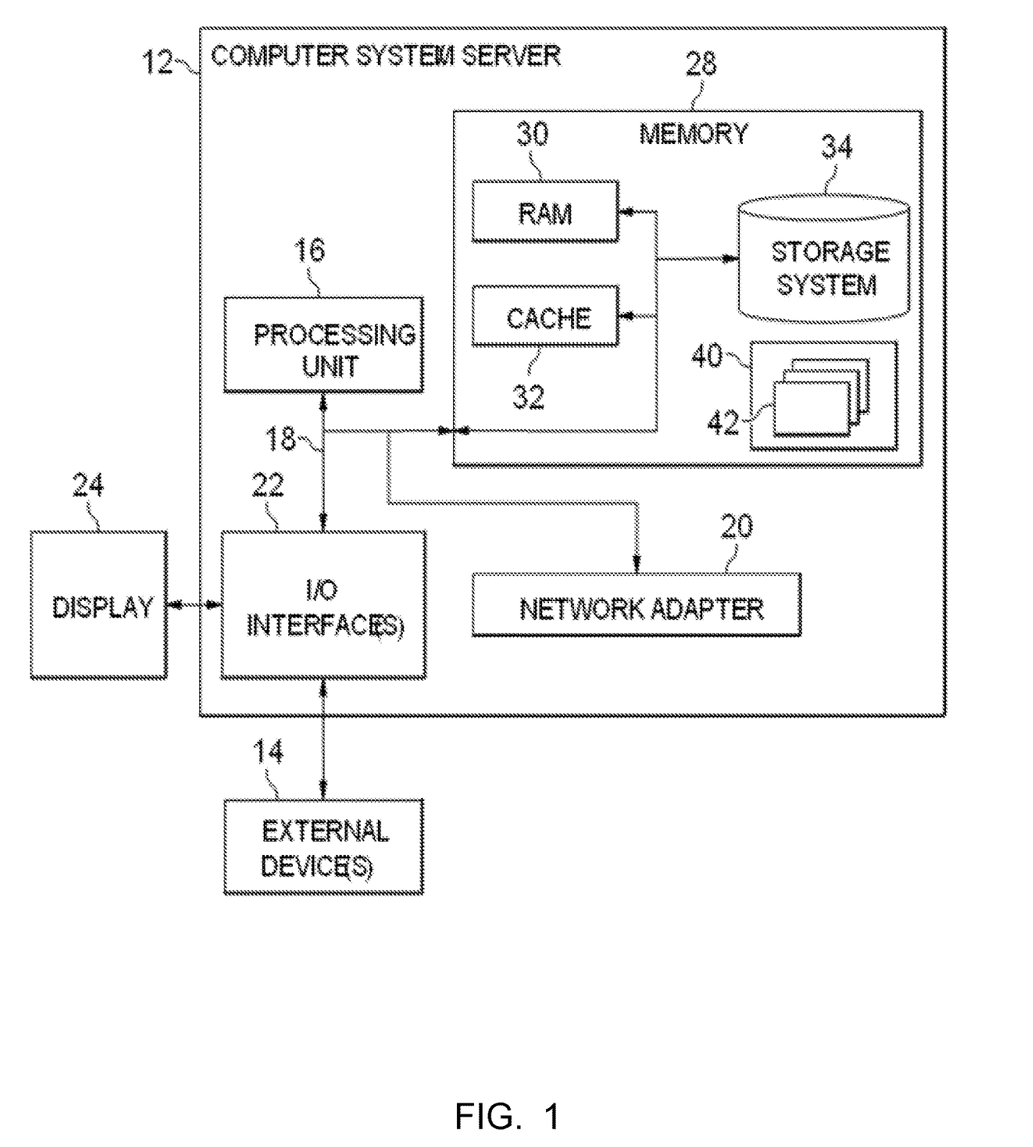
FIG. 1 shows an exemplary computer system/server which is applicable to implement embodiments of the present invention.

Referring now to FIG. 1, where an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 also communicates with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, terms such as "first," "second," and "third" used hereinafter and in the claims are only for distinguishing different description objects, not intended to limit any temporal or spatial sequences. In addition, the term "based on" used hereinafter and in the claims expresses "at least partially based on." The term "use" or the like indicates at least partially using. The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description below.

Figure 2:
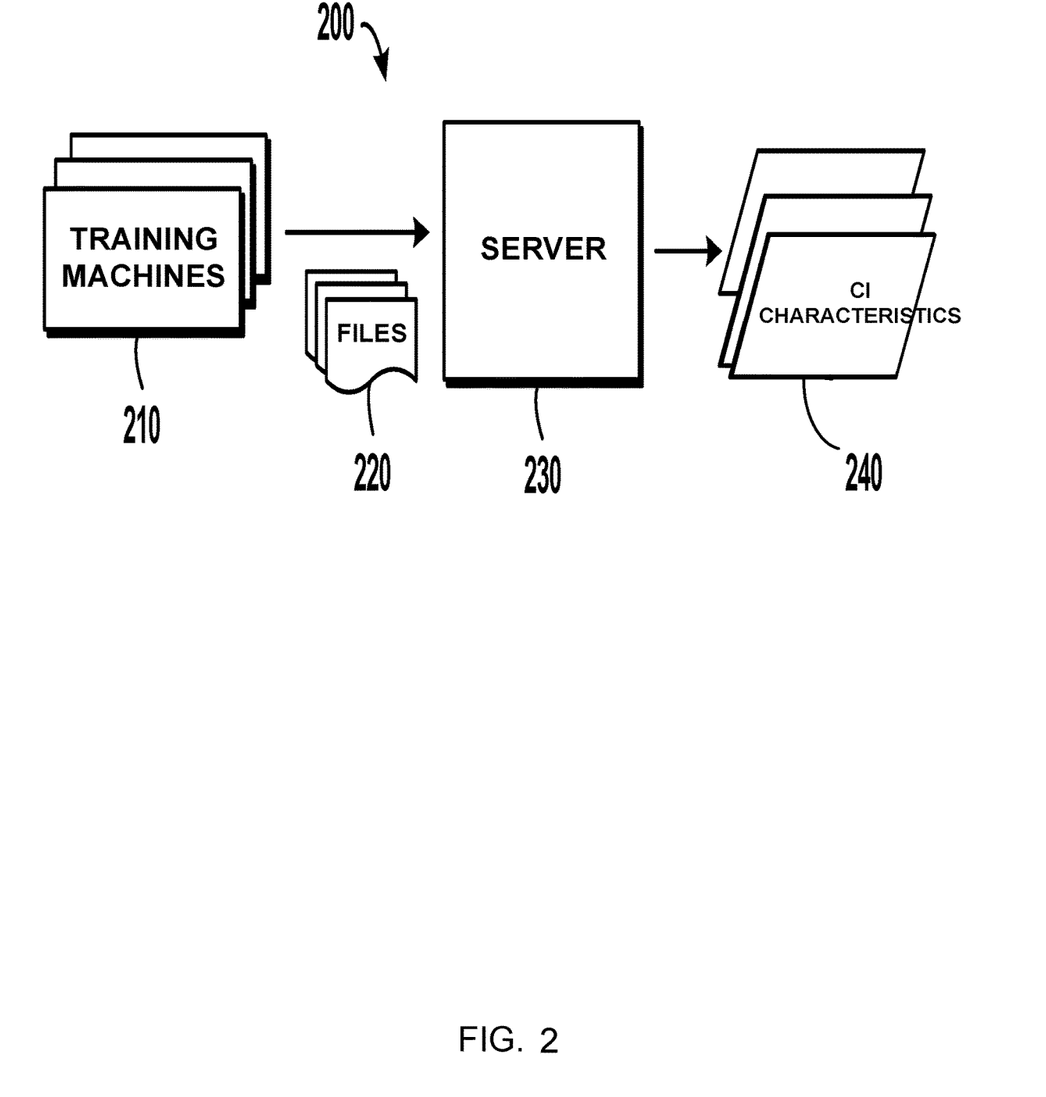
FIG. 2 shows a schematic block diagram of a system environment for determining a characteristic of a configuration file according to embodiments of the present invention.

FIG. 2 shows a schematic block diagram of a system environment 200 where embodiments of the present invention may be implemented. In the environment 200, there are a plurality of machines 210 for providing training files, which are called "training machines." Each of these training machines 210 provides a file 220, from that training machine 210, to a server 230. The training machine 210 and the server 230 can be any appropriate electronic devices, and communicates with each other by any appropriate communication means.

At the server 230, for any given configuration item, candidate configuration files associated with the configuration item can be identified from among files 220 from the plurality of training machines 210. The server 230 then aggregates the candidate configuration files based on one or more feature values of these candidate configuration files. The result of the aggregation is used to determine, which, among these candidate configuration files from the plurality of machines, are true configuration files related to the configuration item. Through a learning or training process, a common characteristic 240 (denoted as "CI characteristic") is extracted, by server 230, from these true configuration files. These CI characteristics 240 are subsequently used in any given target machine to automatically discover configuration files.

In the context of the present disclosure, the term "configuration item" (CI) refers to a configuration parameter or information that needs to be indicated when installing a system on a machine. For example, when installing a WebSphere® Application Server system on a machine, a specific value for "WASCellName" needs to be specified to configure the name of a cell. Therefore, WASCellName is a configuration item in the WebSphere® Application Server system.

Each configuration item has a configuration item value. Typically, the configuration item values vary with different host machine systems and/or application scenarios. For example, suppose the value for WASCellName is specified as "vm81Node01Cell" when the WebSphere® Application Server system is installed on a particular machine. In this example, on this particular machine, the configuration item value for the configuration item WASCellName is "vm81Node01Cell."

Hereinafter, refer to FIG. 3, to describe in detail a method for determining a characteristic of a configuration file according to embodiments of the present invention. The method 300 is performed at the server 230 as described above with reference to FIG. 2, to determine a CI characteristic 240 of configuration files associated with a given one or more configuration items. In particular, in the description with reference to method 300, the work principle and mechanism of embodiments of the present invention will be illustrated from the perspective of the server 230 processing a file 220 from a given training machine 210.

Figure 3:
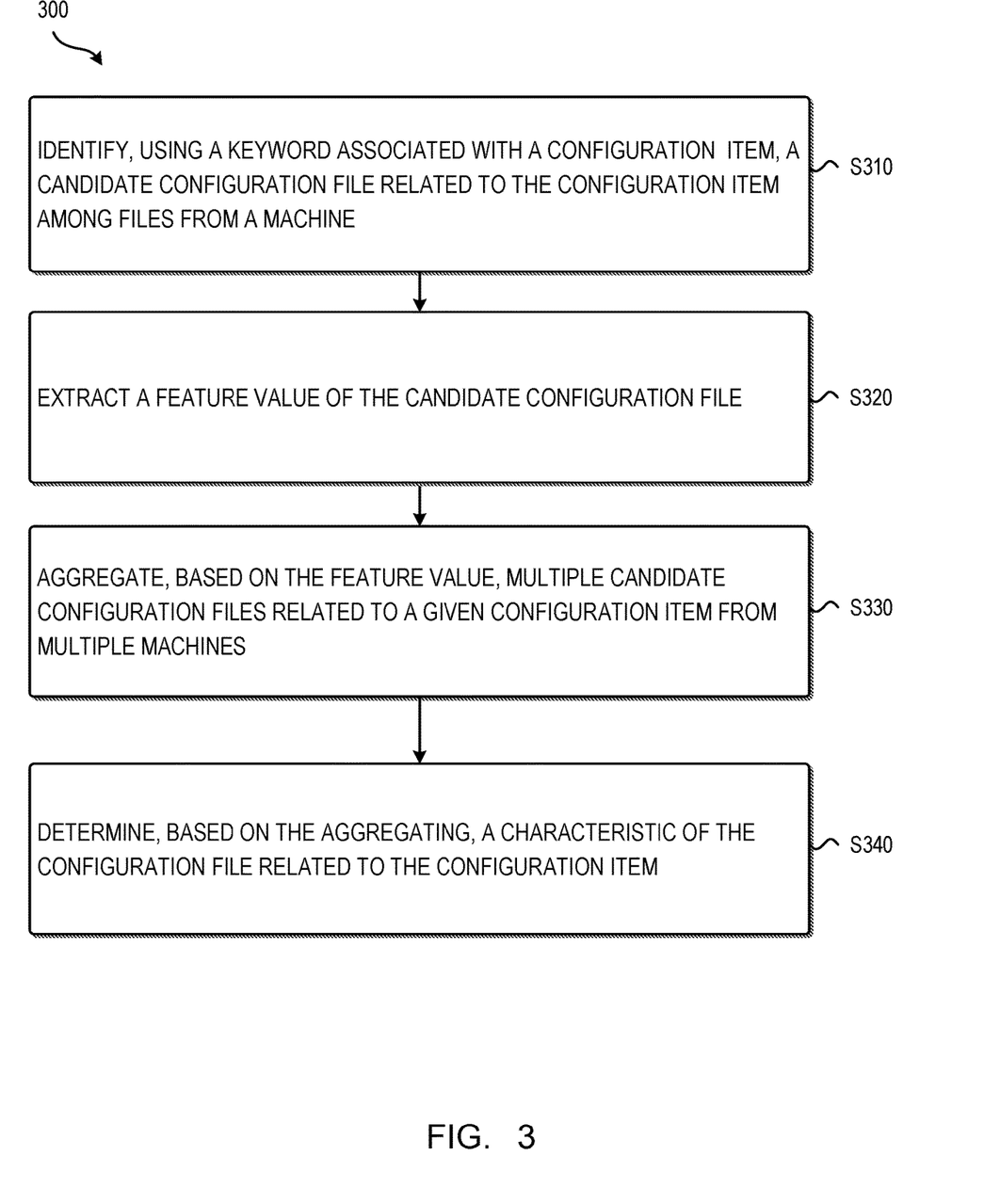
FIG. 3 shows a schematic flow diagram of a method for determining a characteristic of a configuration file according to embodiments of the present invention.

As shown in FIG. 3, the method 300 starts at S310, where a candidate configuration file associated with the configuration item is identified in the file 220 from the given training machine 210.

In some embodiments, at S310, candidate configuration files related to the configuration item may be identified from all files 220 included in the training machines 210, ensuring the broadest coverage and accuracy of the training.

Alternatively, in some embodiments, the server 230 may also pre-filter the files 220 provided by the training machines 210 to remove those files that are apparently not configuration files. For example, in one embodiment, files that apparently are not configuration files, among the files 220, can be identified, for example, based on size, path, affix name, creation time of the file, and/or any other appropriate factors. For example, in one embodiment, all executable files can be filtered by, e.g., files with an affix ".exe," because the possibility for such files belonging to configuration files is very low.

At S310, one or more configuration items are selected to identify relevant candidate configuration files. In one embodiment, for each of these configuration items, a keyword associated with the configuration item is used to identify candidate configuration files from the files 220 in the machines 210.

According to embodiments of the present invention, keywords for identifying candidate configuration files include, at least, configuration item values of the configuration items. For example, in one embodiment, the configuration item value is used as a search keyword. As mentioned above, because the configuration item value is specific to the machine, using the configuration item value as a search keyword advantageously discovers candidate configuration files accurately.

To this end, in one embodiment, the configuration item value of the configuration item in a given training machine 210 may be designated by the user. Alternatively, in another embodiment, the configuration item value may be saved in the training machine 210, and provided along with files 220, by the training machine 210, to the server 230.

Additionally, it should be understood that the content of the search keyword is not limited to the configuration item value. For example, in one embodiment, in addition to the configuration item value, the keyword used to search candidate configuration files can also include a description of the configuration item, such as time constraint, affix name constraint, or any other appropriate additional information.

As an example, the configuration item value in a given training machine 210 for configuration item WASCellName of the WebSphere® Application Server system described above, acts as a keyword for identifying a candidate configuration file in the machine. For example, still suppose that the value of WASCellName in the training machine 210 is "vm81Node01Cell." In this case, at server 230, all files containing the character string "vm81Node01Cell" may be identified from among the files 220 provided by the training machine 210, as candidate configuration files related to the configuration item WASCellName.

Alternatively, in another embodiment, the configuration item "WASCellName" and the configuration item value "vm81Node01Cell" both act as search keywords. In this case, at S310, all files containing character strings "WASCellName" and "vm81Node01Cell" are identified from among files 220 in the training machine 210, as candidate configuration files related to the configuration item WASCellName. As mentioned above, any other additional search constraints may be likewise included in the keywords, and the scope of the present invention is not limited to this aspect.

It should be noted that the candidate configuration files identified at S310 through a keyword search might not only include true configuration files (called "positive instances") related to the configuration item, but also include irrelevant files (called "negative instances") that only include the keywords, but are not configuration files. Positive instances and negative instances are detected and differentiated in subsequent processing and will be described in further detail below.

At S320, feature values of one or more features of the identified candidate configuration files are extracted. The term "feature" refers to file attributes that characterize the characteristic of the file. According to embodiments of the present invention, examples of features include, but are not limited to, one or more of the following: file path, file name, file extension name, file size, access rights, access time, and modification time.

According to embodiments of the present invention, at S320, one or more features of candidate configuration files identified at S310 are used to extract, for each feature, the feature value. An exemplary feature value for the feature "file path" is: "/opt/IBM/WebSphere/AppServer/profiles/AppSrv01/config/cells/vm81Node01Cell/".

An exemplary feature value for the feature "file extension name" is ".xml," and an exemplary feature value for the feature "file size" is "20 k," etc.

According to embodiments of the present invention, the raw values of the feature values are directly used for subsequent processing. Alternatively, the feature values are processed, i.e., normalized, to eliminate any discrepancy among feature values, to provide accuracy for subsequent aggregating, learning, and training processes.

As an example, according to embodiments of the present invention, file path is a feature that is used frequently. The feature value of the feature (i.e., a character string indicating the file path of the candidate configuration file in the given training machine 210) includes a portion specific to the training machine 210. Such a portion is called a "variable portion." In the example described above, the value of the file path is: "/opt/IBM/WebSphere/AppServer/profiles/AppSrv01/config/cells/vm81Node01Cell/."

The character string "/opt/IBM/WebSphere/AppServer/profiles/AppSrv01/" portion of the file path indicates the installation directory of the candidate configuration file in the training machine 210, which varies with the training machine 210. That portion of the path is, therefore, a variable portion in the feature value for the file path feature.

Existence of this variable portion causes the feature value of a file path feature to have a potential discrepancy. In other words, file paths of configuration files related to the same configuration in different training machines 210 might be different from one another. Such a difference can be deleterious to subsequent aggregating and training. Specifically, during a subsequent aggregating process, based on the feature value, candidate configuration files that should be aggregated might not be aggregated due to such differences in the variable portion of the feature value.

To this end, in one embodiment, a variable portion in the feature value may be identified, and replaced with a uniform predetermined identifier. Such an identifier may be random, as long as it is uniform between respective machines 210.

In particular, in some embodiments, the variable portion in the feature value may be pre-defined. For example, for a file path, the user may pre-indicate which portions in the file path vary specifically with machine, either empirically or by experiments. Correspondingly, such pre-defined variable portion may be searched in the file path of each candidate configuration file, and replaced with a predetermined identifier.

Alternatively, in some other embodiments, configuration item values of one or more configuration items may be searched among the feature value, and the portion corresponding to the configuration item value identified as a variable portion. Because the configuration item value of the configuration item in the particular machine is variable, the feature value content including the configuration item value is naturally determined as the variable portion.

Only for the sake of discussion, the example as discussed above is still considered, i.e., the path of a candidate configuration file related to the configuration item "WASCellName" is "/opt/IBM/WebSphere/AppServer/profiles/AppSrv01/config/cells/vm81Node01Cell/." Additionally, suppose there is a configuration item "WASProfileHome" representing the installation root directory, whose configuration item value in the training machine 210 is "/opt/IBM/WebSphere/AppServer/profiles/AppSrv01."

At this point, the file path has the configuration item value of the configuration item "WASProfileHome," i.e., "/opt/IBM/WebSphere/AppServer/profiles/AppSrv01." Therefore, the character string is identified as a variable portion of the feature value for feature file path. In particular, in one embodiment, file path may also be searched using the configuration item "WASCellName" from the training machine 210. In this way, it may be determined that the character string "vm81Node01Cell" in the file path is also a variable portion. Correspondingly, the two variable portions are respectively replaced by uniform identifiers.

In particular, in one embodiment of the present invention, a description of the configuration item may be used to replace the configuration item value. For example, in the above example, the raw feature value of the file path may be modified to "[WASProfileHome]/config/cells/[WASCellName]." The feature value with the variable portion replaced is used in the subsequent processing. By replacing the variable portion in the feature value, discrepancy in the feature values of candidate configuration files can be effectively eliminated, which will be advantageous to subsequent aggregating and learning operations, thereby enhancing the accuracy of discovering configuration files.

It should be understood that the above embodiment depicted with reference to the feature file path is only exemplary, not intended to limit the scope of the present invention in any manner. For example, according to embodiments of the present invention, identification and replacement of a variable portion may be performed on the feature value of any other feature such as file creator, file abstract, etc., thereby eliminating the discrepancy caused by the variable portion.

With continued reference to FIG. 3, the method 300 proceeds at S330, where for the configuration item considered at step S310, based on the feature value obtained at step S320, candidate configuration files from the training machine 210 and candidate configuration files related to the configuration item, but from one or more further training machines 210, are aggregated. In particular, if there is more than one feature that is considered at step S320, these feature values may be combined as the basis for aggregating.

According to embodiments of the present invention, aggregating at S330 may be essentially understood as clustering of candidate configuration files from different training machines 210. To this end, any appropriate clustering method or process may be applied to the candidate configuration files from multiple machines 210. In this way, the candidate configuration files may be divided into a plurality of file clusters. Any currently known or future developed clustering methods may be used in combination with embodiments of the present invention. Examples of the clustering method include, but are not limited to, division methods such as K-mean value approach, density methods such as DBSCAN algorithm, and grid methods such as STING algorithm.

By aggregating, it may be determined which files in the candidate configuration files are true configuration files related to the configuration item in current consideration. For example, in one embodiment, it may be assumed that a file included in a file cluster including most configuration files is a true configuration file. Alternatively, some aggregating algorithms may provide a confidence factor for each file cluster, e.g., in the form of score. Therefore, in one embodiment, it may be regarded that the file included in the highest scoring file cluster is a true configuration file. Selection of the file cluster may also be performed according to any other appropriate standard, or designated by the user.

A file cluster composed of true configuration files forms a positive instance of configuration files. In contrast, the candidate configuration files included in other clusters are negative instances, because they are not true configuration files, but are just files containing keywords associated with the configuration item.

In some embodiments, the result of aggregating, at S330, may be subject to subsequent processing. Alternatively, in one embodiment, the result of aggregating may be displayed to the user to facilitate the user review of the result of aggregating, particularly the file cluster containing the positive instances. For example, the user may remove some non-configuration files contained in the file cluster of positive instances through interaction. Alternatively or additionally, the user may also add those configuration files mistaken as negative instances into the cluster of positive instances from the other file clusters. For another example, the user may modify the feature values of the configuration files. With the user's review and modification, the accuracy of identifying configuration files may be further enhanced.

Next, the method 300 proceeds at S340, where based on the result of the aggregation performed at S330, characteristics of configuration files associated with one or more configuration item may be determined through learning, i.e., the CI characteristic 240 as shown in FIG. 2. Such CI characteristics 240 may be subsequently used for identifying any configuration file related to the corresponding configuration item in the target machine.

Specifically, the result of aggregation performed at S330 may be used as training data, including positive instances and negative instances. In one embodiment, at S340, a classification method may be applied to such training data, thereby finding a boundary between positive instances and negative instances. In other words, in such an embodiment, at S340, a classifier associated with the configuration item is established. According to embodiments of the present invention, any currently existing or future developed classification algorithm may be used to establish a classifier. Examples of the learning algorithm include, but are not limited to, a support vector machine (SVM), a decision tree, and a K nearest neighbor (KNN).

In subsequent use, a relevant feature value of the target file is input into the classifier. The output of the classifier will indicate whether the file is a configuration file related to the configuration item. By performing the method 300 for a plurality of configuration items, classifiers for the plurality of configuration items may be obtained. It should be appreciated that the method 300 may be regarded as a process for modelling CI characteristics of configuration files. Such CI characteristics are then used to discover relevant configuration files in any target machine. Specifically, for a classifier of any particular configuration item, relevant feature values of the files in the target machine may be input into the classifier. As a response, the classifier will indicate whether the file is a configuration file related to that particular configuration item.

It should be understood that, establishing a classifier for each configuration item at S340 is only exemplary, and not intended to limit the scope of the present invention. For example, in some alternative embodiments, feature values of configuration files in a file cluster representing positive instances may be saved. For a given file in the target machine, the feature value of the file may be matched to the feature values of positive instances, e.g., numerical value match and/or character string match, etc. If the match degree between feature values is greater than a predetermined threshold, that file is determined to be a configuration file of the corresponding configuration item. Any other appropriate manner is also feasible.

Figure 4:
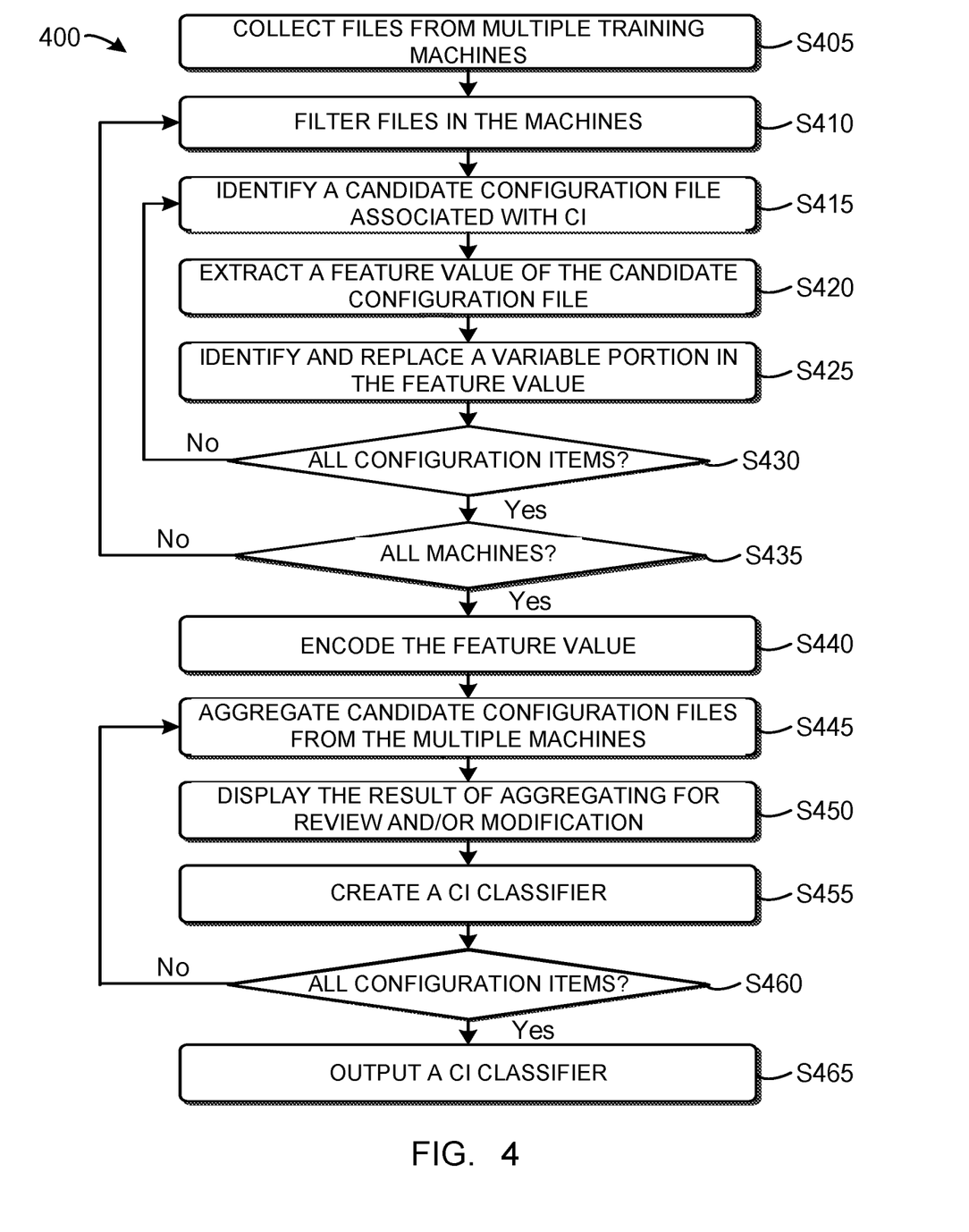
FIG. 4 shows a schematic flow diagram of a method for determining a characteristic of a configuration file according to embodiments of the present invention.

Referring now to FIG. 4, where a method 400 for determining a characteristic of a configuration file according to embodiments of the present invention is presented. It should be understood that the method 400 is a specific implementation of the method 300 described above.

The method 400 starts at S405, where files from a plurality of training machines 210 are collected. Then, the method 400 proceeds at S410, where for the current training machine 210, files in the machine are filtered according to a predefined rule, to exclude those files that are apparently not configuration files. In this way, the burden of subsequent processing is reduced, while the execution efficiency is enhanced.

At S415, for a given configuration item, candidate configuration files are identified using a keyword associated with the configuration item. S415 corresponds to S310 in the method 300. Next, at S420, for one or more given features, the feature value of each candidate configuration file is extracted. Alternatively, at S425, a variable portion in one or more feature values is identified and replaced, thereby eliminating potential discrepancy. S420 and S425 correspond to S320 in the method 300.

The method 400 continues to process at S430, where it is determined if all configuration items that need to be processed have been processed. If there are more configuration items that need to be processed (branch "No"), the method 400 returns to S415, and S415 to S430 are performed repetitively for the next configuration item.

On the contrary, if it is determined at S430 that all configuration items that need to be processed have been processed (branch "yes"), the method 400 proceeds to S435, where it is determined whether files from all machines 210 have been processed. If there are still files that have not been processed yet (branch "No"), the method 400 returns to S410 to repeat the above processes for the next machine.

On the other hand, if it is determined at S435 that the candidate configuration files from all machines 210 have been processed (branch "yes"), the method 400 proceeds to S440, where one or more feature values to be used for aggregating are encoded. For example, all feature values of character string type may be encoded into a numeral value form.

At S445, for the configuration item in current consideration, based one or more feature values encoded at S440, candidate configuration files from a plurality of machines are aggregated, thereby generating a plurality of file clusters. S445 corresponds to S330 in the method 300.

At S450, these file clusters are displayed to the user, and modifications to one or more file clusters are received from the user. For example in one embodiment, all file clusters obtained through aggregating are displayed to the user for review and/or modification. Alternatively, only clusters regarded as containing positive instances (i.e., true configuration files) are displayed to the user for review and/or modification.

The method 400 then proceeds at S455 where a classifier for the current configuration item is generated by applying a learning process. S455 corresponds to S340 in the method 300. Next, the method determines, at S460, whether classifiers for all configuration items have been generated. If there are still configuration items that remain unprocessed (branch "No"), the method 400 returns to S445 to aggregate and learn relevant candidate configuration files for the next configuration item.

On the contrary, if it is determined at S460 that classifiers for all configuration items in consideration have been generated (branch "yes"), the method 400 proceeds at S465, where classifiers of one or more configuration items are output. These classifiers may be used to automatically and accurately discover configuration files in any target machine.

In particular, it should be appreciated that in the method 400 described with reference to FIG. 4, S410 to S430 are performed for one training machine, whereas S415 to S425 are performed for each configuration item, and S445 to S465 are performed on files provided from multiple training machines 210.

Figure 5:
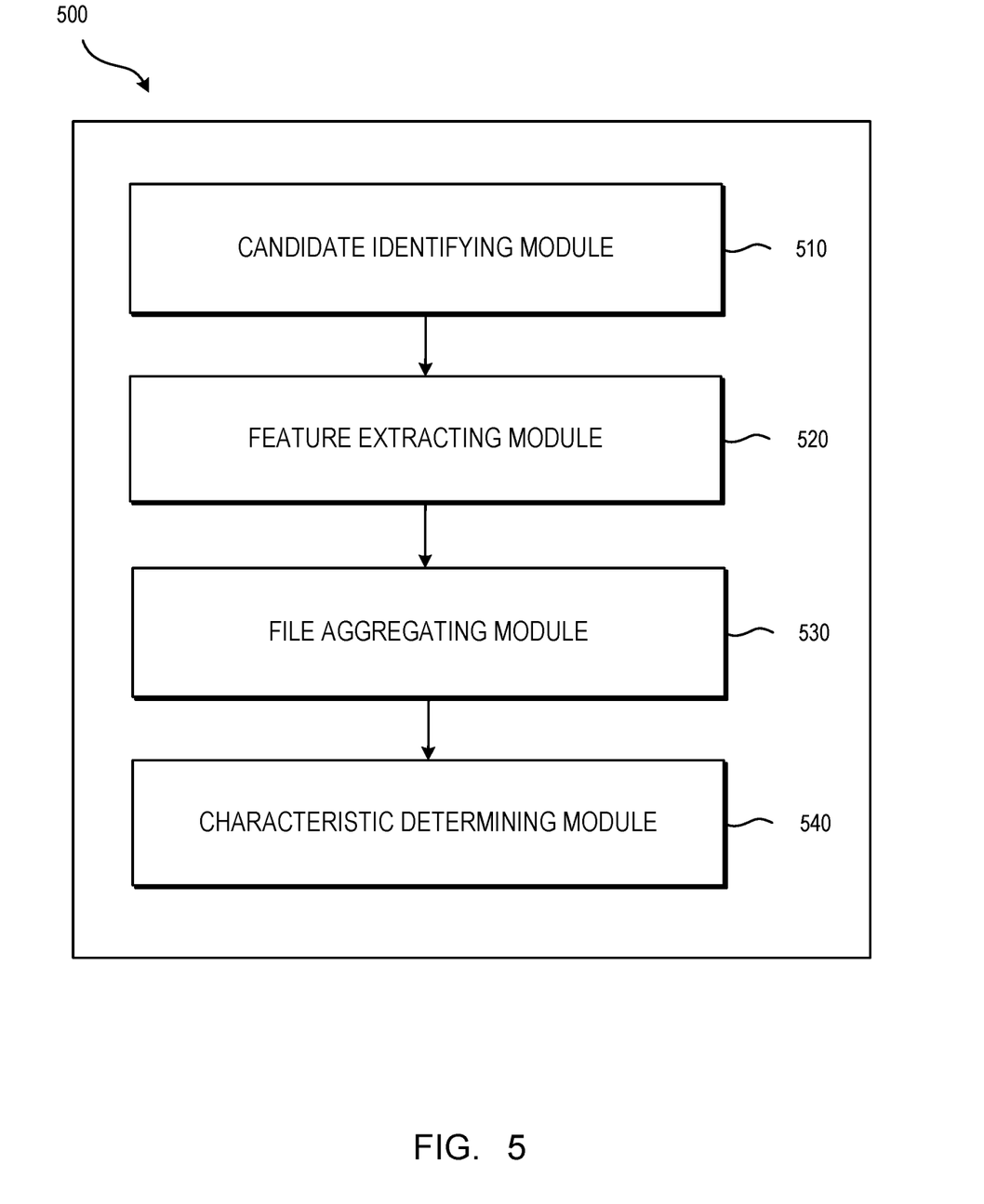
FIG. 5 shows a schematic block diagram of a system for determining a characteristic of a configuration file according to embodiments of the present invention.

FIG. 5 shows a schematic block diagram of a system 500 for determining a characteristic of a configuration file according to embodiments of the present invention. As shown, the system 500 includes: a candidate identifying module 510 configured to identify, using keywords associated with a configuration item, a candidate configuration file related to the configuration item from among files from a machine; a feature extracting module 520 configured to extract a feature value of the candidate configuration file; a file aggregating module 530 configured to aggregate, based on the feature value, the candidate configuration file with a candidate configuration file which is related to the configuration item and which is from at least one further machine, to determine a configuration file related to the configuration item; and a characteristic determining module 540 configured to determine, based on the aggregating, a characteristic of the configuration file related to the configuration item, the characteristic being used to discover a configuration file related to the configuration item in a target machine.

In one embodiment, the system 500 further includes: a file filtering module configured to filter the files from the machine based on a predetermined rule prior to the identifying of the candidate configuration file.

In one embodiment, the candidate identifying module 510 includes: a keyword searching module configured to search each candidate configuration file from among the plurality of files from the machine using a value of the configuration item in the machine.

In one embodiment, the feature extracting module 520 includes: a raw feature extracting module configured to extract a raw feature value of the candidate configuration file; and a discrepancy eliminating module configured to eliminate a discrepancy in the raw feature value to generate the feature value.

In one embodiment, the discrepancy eliminating module includes: a variable portion identifying module configured to identify a variable portion of the raw feature value; and a variable portion replacing module configured to replace the variable portion with a predetermined identifier.

In one embodiment, the variable portion identifying module includes: a configuration item-based identifying module configured to identify a part of identification in the feature value corresponding to values of one or more configuration items in the machine as the variable portion.

In one embodiment, the system 500 further includes: an aggregating result displaying module configured to display a result of aggregation to a user prior to determining the characteristic of the configuration file related to the configuration item; an input receiving module configured to receive an input from the user; and an aggregation result modifying module configured to modify the result of the aggregation based on the input.

In one embodiment, the characteristic determining module 540 includes: a classifier creating module for creating a classifier for the configuration item based on the result of the aggregation.

It should be noted that for the sake of clarity, FIG. 5 does not show optional modules or sub-modules included in the system 500. All features and operations as described above are suitable for system 500, respectively, which are therefore not detailed here. Moreover, partitioning of modules or sub-modules in system 500 is exemplary, rather than limiting, intended to describe its main functions or operations logically. A function of one module may be implemented by a plurality of other modules; on the contrary, a plurality of modules may be implemented by one module. The scope of the present invention is not limited in this aspect.

Moreover, the modules included in the system 500 can be implemented in various manners, including software, hardware, firmware or a random combination thereof. For example, in some embodiments, the system 500 can be implemented by software and/or firmware. Alternatively or additionally, the system 500 can be implemented partially or completely based on hardware. for example, one or more modules in the system 500 can be implemented as an integrated circuit (IC) chip, an application-specific integrated circuit (ASIC), a system on chip (SOC), a field programmable gate array (FPGA), etc. The scope of the present intention is not limited in this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies discovered in the marketplace, or to enable others of ordinary skill in the art to understand the embodiments disclosed herein.

What is claimed is:

1. A method for performing configuration management of a computer, the method comprising:
identifying, by the computer, candidate configuration files from among a plurality of files from a training machine by searching the content of the plurality of files from the training machine for keywords associated with configuration items of the machine, wherein a configuration item is a configuration parameter or information that needs to be indicated when installing a system on a machine;
extracting, by the computer, file attribute values of the identified candidate configuration files, wherein the file attribute values have a variable portion;
clustering, by the computer, candidate configuration files identified as having the same configuration item keywords, based on the extracted file attribute values;
classifying, by the computer, each cluster of candidate configuration files related to a configuration item as being configuration files related to the configuration item or as not configuration files;
determining, by the computer, for each cluster of candidate configuration files identified as having the same configuration item keywords, one or more file attribute values that can be used to determine when a candidate configuration file is a configuration file related to the configuration item; and
determining, by the computer using a learning algorithm, the configuration file related to the configuration item from among each cluster of the candidate configuration files based on a result of the determination that the each cluster of candidate configuration files identified as having the same configuration item keywords, wherein the learning algorithm is selected from a group consisting of: a support vector machine (SVM), a decision tree, and a K nearest neighbor (KNN); and
based on determining the configuration file is related to the configuration item, replacing the variable portion with a predetermined identifier.

2. The method of claim 1, further comprising:
receiving, by the computer from a target machine, a plurality of files;
extracting, by the computer, file attribute values of the received files;
determining, by the computer, which of the files are configuration files, based on the determined one or more file attribute values that can be used to determine when a candidate configuration file is a configuration file related to a configuration item of the target machine; and
performing configuration management on one or more of the target machine files determined to be configuration files of the target machine.

3. The method according to claim 1, wherein the keywords associated with configuration items of the machine include one or more keywords from the list consisting of: configuration item value, configuration item name, and a description of the configuration.

4. The method according to claim 1, wherein the file attributes are one or more file attributes selected from the list consisting of: file path, file name, file extension name, file size, file access rights, file access time, and file modification time.

5. The method according to claim 1, wherein clustering candidate configuration files is accomplished by performing one or more clustering methods from the list consisting of: division methods, K-mean value approach, density methods, DBSCAN algorithm, grid methods, and STING algorithm.

6. The method according to claim 1, further comprising:
filtering, by the computer, the plurality of files from the machine based on a predetermined rule prior to the identifying of the candidate configuration file.

7. The method according to claim 1, wherein determining, by the computer, the configuration file related to the configuration item from among the each cluster of candidate configuration files based on the result of the determination that each cluster of the candidate configuration files identified as having the same configuration item keywords further comprises:
- displaying, by the computer, the result of the determination that each cluster of the candidate configuration files identified as having the same configuration item keywords;
- receiving, by the computer, an input from a user; and
- modifying, by the computer, the result of the determination that each cluster of the candidate configuration files identified as having the same configuration item keywords based on the input.

8. The method according to claim 1, further comprising:
- filtering, by the computer, the plurality of files from the machine based on a predetermined rule prior to the identifying of the candidate configuration file;
- identifying, by the computer, a portion of the extracted file attribute values corresponding to values of one or more configuration items of the machine as a portion of the extracted file attribute values that is specific to the machine; and
- replacing, by the computer, the portion of the extracted file attribute values that is specific to the machine with a predefined identifier.

9. A computer program product for performing configuration management of a computer, the computer program product comprising one or more computer readable storage medium and program instructions stored on at least one of the one or more computer readable storage medium, the program instructions comprising:
- program instructions to identify, by the computer, candidate configuration files from among a plurality of files from a training machine by searching the content of the plurality of files from the training machine for keywords associated with configuration items of the machine, wherein a configuration item is a configuration parameter or information that needs to be indicated when installing a system on a machine;
- program instructions to extract, by the computer, file attribute values of the identified candidate configuration files, wherein the file attribute values have a variable portion;
- program instructions to cluster, by the computer, candidate configuration files identified as having the same configuration item keywords, based on the extracted file attribute values;
- program instructions to classify, by the computer, each cluster of candidate configuration files related to a configuration item as being configuration files related to the configuration item or as not configuration files;
- program instructions to determine, by the computer, for each cluster of candidate configuration files identified as having the same configuration item keywords, one or more file attribute values that can be used to determine when a candidate configuration file is a configuration file related to the configuration item; and
- program instructions to determine, by the computer using a learning algorithm, the configuration file related to the configuration item from among each cluster of the candidate configuration files based on a result of the determination that the each cluster of candidate configuration files identified as having the same configuration item keywords, wherein the learning algorithm is selected from a group consisting of: a support vector machine (SVM), a decision tree, and a K nearest neighbor (KNN); and
- based on determining the configuration file is related to the configuration item, program instructions to replace the variable portion with a predetermined identifier.

10. The computer program product of claim 9, further comprising:
- receiving, by the computer from a target machine, a plurality of files;
- extracting, by the computer, file attribute values of the received files;
- determining, by the computer, which of the files are configuration files, based on the determined one or more file attribute values that can be used to determine when a candidate configuration file is a configuration file related to a configuration item of the target machine; and
- performing configuration management on one or more of the target machine files determined to be configuration files of the target machine.

11. The computer program product according to claim 9, wherein the keywords associated with configuration items of the machine include one or more keywords from the list consisting of: configuration item value, configuration item name, and a description of the configuration.

12. The computer program product according to claim 9, wherein the file attributes are one or more file attributes selected from the list consisting of: file path, file name, file extension name, file size, file access rights, file access time, and file modification time.

13. The computer program product according to claim 9, wherein clustering candidate configuration files is accomplished by performing one or more clustering methods from the list consisting of: division methods, K-mean value approach, density methods, DBSCAN algorithm, grid methods, and STING algorithm.

14. The computer program product according to claim 9, further comprising:
- program instructions to filter, by the computer, the plurality of files from the machine based on a predetermined rule prior to the identifying of the candidate configuration file.

15. The computer program product according to claim 9, wherein program instructions to determine, by the computer, the configuration file related to the configuration item from among the each cluster of candidate configuration files based on the result of the determination that each cluster of the candidate configuration files identified as having the same configuration item keywords further comprises:
- program instructions to display, by the computer, the result of the determination that each cluster of the candidate configuration files identified as having the same configuration item keywords;
- program instructions to receive, by the computer, an input from a user; and
- program instructions to modify, by the computer, the result of the determination that each cluster of the candidate configuration files identified as having the same configuration item keywords based on the input.

16. The computer program product according to claim 9, further comprising:
- program instructions to filter, by the computer, the plurality of files from the machine based on a predetermined rule prior to the identifying of the candidate configuration file;

program instructions to identify, by the computer, a portion of the extracted file attribute values corresponding to values of one or more configuration items of the machine as a portion of the extracted file attribute values that is specific to the machine; and program instructions to replace, by the computer, the portion of the extracted file attribute values that is specific to each machine with a predefined identifier.

\* \* \* \* \*